(12) United States Patent
Hondou (10) Patent No.: US 8,074,029 B2
(45) Date of Patent: Dec. 6, 2011

(54) PROCESSOR EQUIPPED WITH A PRE-FETCH FUNCTION AND PRE-FETCH CONTROL METHOD

(75) Inventor: Mikio Hondou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 661 days.

(21) Appl. No.: 12/200,369

(22) Filed: Aug. 28, 2008

(65) Prior Publication Data

US 2009/0037663 A1 Feb. 5, 2009

Related U.S. Application Data

(63) Continuation of application No. PCT/JP2006/303743, filed on Feb. 28, 2006.

(51) Int. Cl.
*G06F 12/00* (2006.01)

(52) U.S. Cl. ............ 711/137; 711/144; 711/156

(58) Field of Classification Search ............ 711/137, 711/144, 156
See application file for complete search history.

(56) References Cited

U.S. PATENT DOCUMENTS

| | | | |
|---|---|---|---|
| 6,131,145 | A | 10/2000 | Matsubara et al. |
| 6,195,735 | B1 | 2/2001 | Krueger et al. |
| 6,460,115 | B1 | 10/2002 | Kahle et al. |
| 6,606,688 | B1 * | 8/2003 | Koyanagi et al. ............ 711/137 |
| 7,228,362 | B2 * | 6/2007 | Jen et al. ............ 710/6 |
| 7,493,480 | B2 * | 2/2009 | Emma et al. ............ 712/240 |
| 2003/0208659 | A1 | 11/2003 | Matsubara et al. |

| | | | |
|---|---|---|---|
| 2004/0003179 | A1 | 1/2004 | Shirahige et al. |
| 2004/0039878 | A1 | 2/2004 | van de Waerdt |
| 2004/0049615 | A1 | 3/2004 | Liang |
| 2006/0026594 | A1 | 2/2006 | Yoshida et al. |

FOREIGN PATENT DOCUMENTS

| | | |
|---|---|---|
| EP | 1 622 003 A1 | 2/2006 |
| JP | 61-169949 | 7/1986 |
| JP | 2-301843 | 12/1990 |
| JP | 6-149669 | 5/1994 |
| JP | 7-129464 | 5/1995 |
| JP | 9-128293 | 5/1997 |
| JP | 2000-339157 | 12/2000 |
| JP | 2004-38345 | 2/2004 |
| JP | 2006-40141 | 2/2006 |
| JP | 2006-48181 | 2/2006 |
| JP | 2006-48182 | 2/2006 |

OTHER PUBLICATIONS

Japanese Office Action mailed Dec. 15, 2009 in corresponding Japanese Patent Application 2008-502585.
Japanese Office Action mailed Apr. 14, 2009 and issued in corresponding Japanese Patent Application 2008-502585.
European Search Report mailed Jul. 23, 2009 and issued in corresponding European Patent Application 06714873.4.
International Search Report for PCT/JP2006/303743, mailed Aug. 22, 2006.

* cited by examiner

*Primary Examiner* — Stephen Elmore
(74) *Attorney, Agent, or Firm* — Staas & Halsey LLP (57) ABSTRACT

A processor equipped with a pre-fetch function comprises: first layer cache memory having a first line size; second layer cache memory that is on the under layer of the first layer cache memory and that has a second line size different from the first line size; and a pre-fetch control unit for issuing a pre-fetch request from the first layer cache memory to the second layer cache memory so as to pre-fetch a block equivalent to the first line size for each second line size.

11 Claims, 9 Drawing Sheets

| COMPARATOR 42 | 7 | 6 | 5 | 4 | 3 | 2 | 1 | 0 | |
|---|---|---|---|---|---|---|---|---|---|
| 0 | 0 | 1 | 0 | 0 | 0 | 0 | 0 | 0 | +64 |
| 0 | 1 | 0 | 0 | 0 | 0 | 0 | 0 | 0 | +128 |
| 0 | 1 | 1 | 0 | 0 | 0 | 0 | 0 | 0 | +192 |
| 1 | 0 | 0 | 0 | 0 | 0 | 0 | 0 | 0 | +256 |

F I G. 4

|  | L1$ MIB Address | L1$ MIB Data | L1$ data | PROCESSING |
|---|---|---|---|---|
| PROCEDURE 8 | ○ | × | × | ABORT |
| PROCEDURE 9 | ○ | ○ | × | FROM L1$MIB |
| PROCEDURE 10 | ○ | ○ | ○ | DIRECTLY FROM L1$ |

# PROCESSOR EQUIPPED WITH A PRE-FETCH FUNCTION AND PRE-FETCH CONTROL METHOD

CROSS REFERENCE TO RELATED APPLICATION

This application is a continuation application of international PCT application No. PCT/JP2006/303743 filed on Feb. 28, 2006.

BACKGROUND OF THE INVENTION

1. Field of the Invention

The present invention relates to a processor comprising cache memory having two or more layers of which the line sizes are mutually different, and, in particular, to a technique related to a processor equipped with a pre-fetch function applicable to the cache memory.

2. Description of the Related Art

A pre-fetch technique has conventionally been applied to a cache register in a computer executing a continuous access to memory used for a scientific calculation, such as a high performance computing (HPC), and the like.

The pre-fetch is a method for predicting instructions or data required in the near future and for reading them in cache memory or the like, and thereby a cache miss of the cache memory can be reduced.

Reference document 1 has disclosed a cache system equipped with a pre-fetch function. The system according to reference patent document 1 is configured to register, in a queue, a predicted address to be accessed next in the future distanced by a line size in a continuous access due to a cache miss when accessing memory data continuously and is configured to issue a pre-fetch instruction to the address to be accessed next in the future distanced by the line size by deciding that it is an event of continuous access, if the actual access address hits the queue, thus proving the prediction being correct.

If the line sizes between the upper layer cache memory and lower layer cache memory in multi-layered cache memory are different, the data size moved resulting from a cache miss in the lowest layer is any of the line size of the higher layer and of the lower layer. Further, in the case of a continuous access in which the function of a hardware fetch works, the case of the move-in data size being the lower layer line size of which the data size being the maximum exerts the highest performance and therefore the move-in data size is most possibly the data size of the lower layer cache memory in the above described case.

For example, in a memory system, the data size moved in by a cache miss is the line size of the lower cache in a memory access, while the data size is the line size of the higher cache in the case of a copy back.

In an HPC-series Job in which continuous access occurs in the majority of cases, a copy-back ratio is low, and therefore a move-in data size is highly possibly the line size of the lowest cache in the case of the above described continuous access.

Carrying out a pre-fetch in a cache memory system having different line sizes between the upper layer cache memory and lower layer cache memory causes the problem as follows.

If a data size moved in due to a cache miss in the lower layer is the line size of the lower layer cache, a request for a hardware pre-fetching issued from the upper layer cache to the lower layer cache (i.e., a request for a move-in to the lower layer cache) is only required for the line size of the lower layer cache. In the conventional cache system, however, the request is actually issued for each line size of the higher layer cache, resulting in the consuming of an extraneous lower layer cache access pipeline.

If a data size moved in due to a cache miss in the lower layer is the line size of the lower layer cache, a request for a hardware pre-fetching issued to the lower layer cache is only required for the line size of the lower layer cache. A hardware pre-fetching, however, sometimes loses a pre-fetch request due to implementation limitations, and in such a case of losing the request, only one issue of the pre-fetch request causes a failure in issuing a request for moving memory data into the lower layer cache.

If a data size moved in due to a cache miss in the lower layer cache register is the line size of the lower layer cache, a request for a hardware pre-fetching issued to the lower layer cache is only required for the line size of the lower layer cache memory. Therefore, if the address of a destination, which is next to upper layer cache memory by the line size thereof relative to the address which has been missed in the upper layer cache register is designated as the initial value of the pre-fetch address of a pre-fetch request, a lower layer cache access pipeline is wasted because of an extraneous pre-fetch request because there is a possibility that the address is the same line for the lower layer cache memory.

In the case of a continuous access to memory, in which a pre-fetch function works, a data size moved into the lower layer cache memory is highly possibly the line size of the lower layer cache and also possibly a data size different from the line size of the lower layer cache in some cases.

Patent document 1: Laid-Open Japanese Patent Application Publication No. 2004-38345

SUMMARY OF THE INVENTION

The problem for the present invention is to provide a processor equipped with a pre-fetch function with the above described problem solved.

In order to solve the above described problem, a processor equipped with a pre-fetch function according to the present invention comprises first layer cache memory, second layer cache memory, and a pre-fetch control unit.

The first layer cache memory has a first line size.

The second layer cache memory is on the under layer of the first layer cache memory and has a second line size different from the first line size.

The pre-fetch control unit issues a pre-fetch request from the first layer cache memory to the second layer cache memory so as to pre-fetch a block equivalent to the first line size for each second line size.

This configuration makes it possible to prevent an issuance of an unnecessary pre-fetch request.

The pre-fetch control unit may also be configured to issue one or more pre-fetch requests for each of the second line size.

The pre-fetch control unit may also be configured to issue the pre-fetch request so as to pre-fetch a block equivalent to twice the first line size or more.

This configuration makes it possible to deal with the case of a pre-fetch request being lost due to implementation limitations.

Furthermore, the pre-fetch control unit may also be configured to designate an address distanced by the second line size beyond an address, which has been missed in the first layer cache memory, as the address of a pre-fetch destination that is to be requested for the pre-fetch.

Further, the pre-fetch control unit may also comprise a changeover unit for changing over between issuing the pre-fetch request for each of the first line size and issuing the pre-fetch request for each of the second line size on the basis of the size of moved-in data.

This configuration makes it possible to deal with a move-in other than the second line size such as a copy back.

The present invention is contrived to issue a pre-fetch request for each second line size which is the line size of the second layer cache memory in place of the first layer cache memory, and thereby a consumption of access pipelines of the second layer cache memory due to extra issuance can be suppressed.

Further, the configuration for improving the possibility of issuing a move-in request to the second layer cache memory for moving in memory data enables an improvement in performance even if a pre-fetch request is lost due to the limitation of implementation.

Furthermore, the configuration of designating a future address distanced by the line size of the second layer cache memory, in place of a future address distanced by the first line size beyond an address, which has been missed in said first layer cache memory, as the initial value of the pre-fetch address of a hardware pre-fetching makes it possible to suppress the consumption of the second layer cache access pipeline due to an extraneous request.

Meanwhile, the configuration of issuing a hardware pre-fetching request in accordance with the data size eventually delivered makes it possible to issue a request correctly without the failure of issuing necessary requests even if a data size delivered to the second layer cache memory is different from the line size of the second layer cache memory.

DESCRIPTION OF THE PREFERRED EMBODIMENT

The following is a description of the preferred embodiment of the present invention made by referring to the accompanying drawings.

Figure 1:
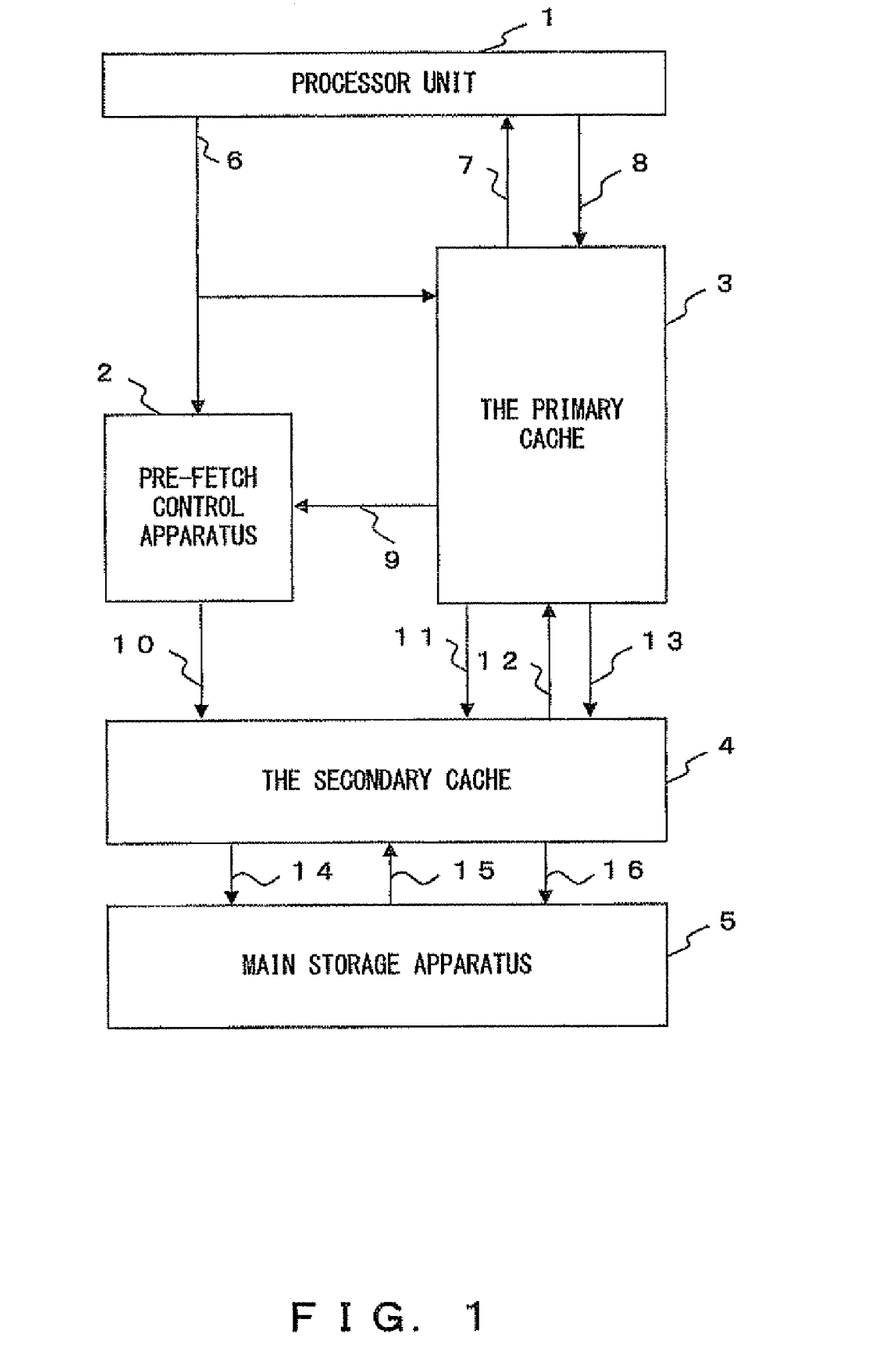
FIG. 1 is an outline diagram of the configuration of a processor and its peripherals of a computer system according to the present embodiment.

FIG. 1 is an outline diagram of the configuration of a processor and its computer system peripherals according to the present embodiment.

The configuration of FIG. 1 comprises a processor unit 1, a pre-fetch control apparatus 2, a primary cache 3, a secondary cache 4, and a main storage apparatus 5.

The processor unit 1, comprising an arithmetic logical operation unit (ALU), a register, and the like, is the part managing actual calculation and data processing. Further, in the configuration shown in FIG. 1, branch predictions and the like are carried out within the processor unit 1, and a request based on the prediction result is made to the primary cache 3. The pre-fetch control apparatus 2, which is the apparatus in charge of the overall control of a pre-fetch process, makes a request to the secondary cache 4 for a pre-fetch while monitoring the request address of the primary cache 3. The primary cache 3, comprising memory capable of high access speed and a primary cache control apparatus, is the primary cache system. The secondary cache 4, comprising a memory in which the access speed is faster than the main storage apparatus 5 and of which the capacity is larger than the primary cache 3, is the secondary cache system. Further, the present embodiment is configured to retain pre-fetched data in the secondary cache 4. The main storage apparatus 5 is memory constituted by DRAM and the like.

When accessing data in the main storage apparatus 5, the processor unit 1 designates a requested address from a request address 6, reads out fetched data 7 when reading out, and outputs the data as stored data 8 to the primary cache 3 when writing.

For a readout request from the processing unit 1, if the primary cache 3 per seretains the data of the requested address, the primary cache 3 outputs the data as the fetched data 7 to the processor unit 1, while if the primary cache 3 does not retain the data, the primary cache 3 makes a request to the secondary cache 4 for data equivalent to one line including the aforementioned data from a request bus 11, and also it reports a cache miss to the pre-fetch control apparatus 2. Then, receiving the fetched data 12, the primary cache 3 outputs the data requested by the processor unit 1 as the fetched data 7. Meanwhile, if the cache data retained by the primary cache 3 per se is updated, the primary cache 3 writes back the data to the secondary cache 4 from a data bus 13 at an appropriate time.

If the secondary cache 4 retains data for a request for the data from the primary cache 3, the secondary cache 4 outputs data equivalent to a line that includes the requested data as the fetched data 7 to the primary cache 3, while if it does not retain the data, the secondary cache 4 requests the main storage apparatus 5 for data equivalent to a line that includes the requested data from a request bus 14. Then, receiving the fetched data 15, the secondary cache 4 outputs data equivalent to one line to the primary cache 3. When the cache data retained by the secondary cache 4 is updated, it writes back the data to the main storage apparatus 5 from a data bus, as in the case of the primary cache 3.

When requesting the primary cache 3 for data, the processor unit 1 designates an address by way of the address bus 6, in which case the pre-fetch control apparatus 2 monitors the address value and searches a pre-fetch address queue comprised by the pre-fetch control apparatus 2 by using the address value. Then, if the address exists within one block headed by an address existing in the pre-fetch address queue (which is called a "hit"), a pre-fetch request is made by outputting a pre-fetch request address from a pre-fetch address bus 10 to the secondary cache 4, and also the address is registered in a pre-fetch address queue 25. If the address does not exist in the pre-fetch address queue, a pre-fetch is not requested.

Note that the present embodiment is configured such that the primary cache 3 and secondary cache 4 are cache memory having mutually different line sizes and that the following description is provided by assuming that the line size of the primary cache 3 is 64 bytes (simply noted as 'B' hereinafter) and the line size of the secondary cache 4 is 256 B.

Figure 2:
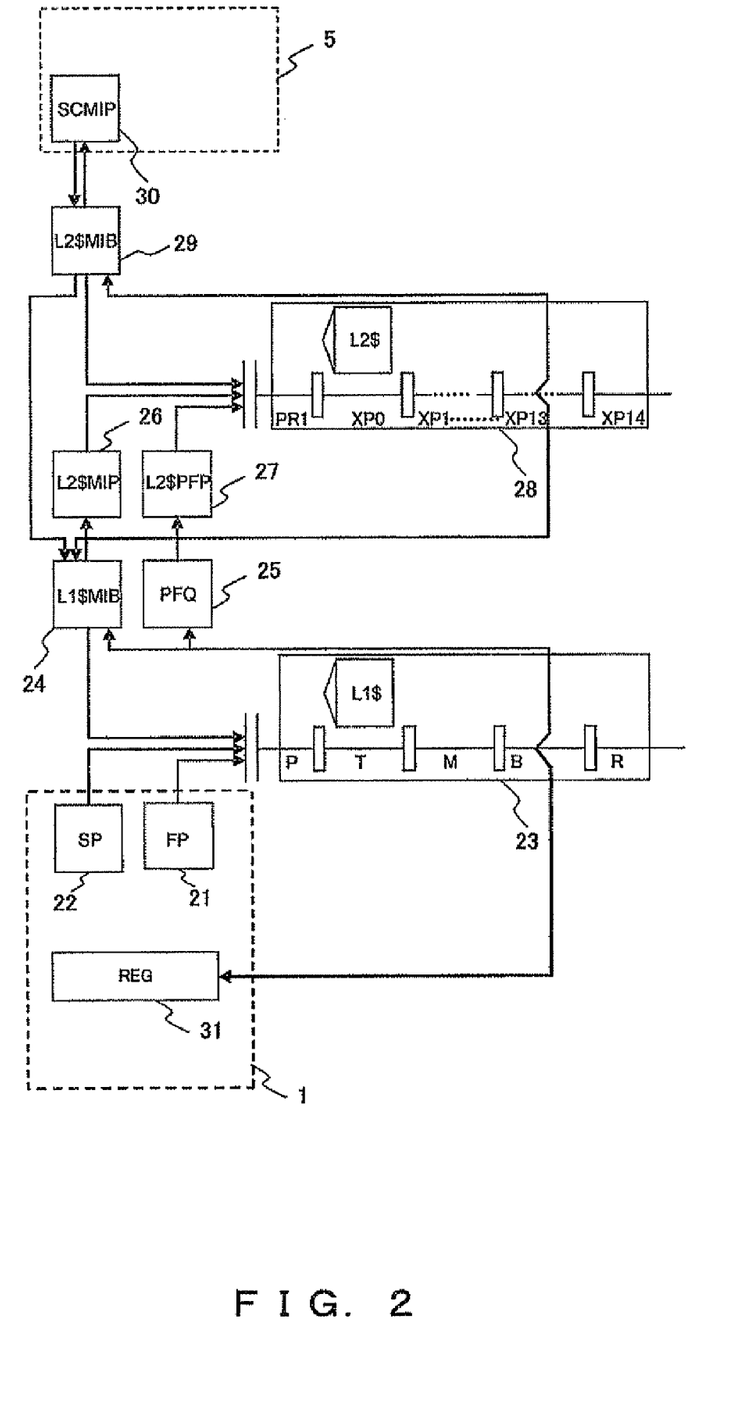
FIG. 2 is a diagram of the delineation centered about the memory management part of a processor according to the present embodiment.

FIG. 2 is a diagram of the delineation centered about the memory management part of a processor according to the present embodiment.

Referring to FIG. 2, the processor comprises, as constituent components for managing memory, a fetch port (FP) 21, a store port (SP) 22, a primary cache access pipeline 23, and a primary cache move-in buffer (L1 $ MIB) 24, all within the primary cache 3; a pre-fetch queue (PFQ) 25 within the pre-fetch control apparatus 2; a secondary cache move-in port (L2 $ MIP) 26, a secondary cache pre-fetch port (L2 $ PFP) 27, a secondary cache access pipeline 28, and a secondary cache move-in buffer (L2 $ MIB) 29, all within the secondary cache 4; and a system controller move-in port (SCMIP) 30 within the main storage apparatus 5.

The fetch port (FP) 21 is the port used for receiving load instructions and store instructions, both from the processor unit 1. Further, the store port (SP) 22 is a port for a store-committed store instruction for writing data to cache memory. Further, the secondary cache move-in buffer (L2 $ MIB) 29 and system controller move-in port (SCMIP) 30 are ports for receiving a move-in request to the secondary cache 4 and main storage apparatus 5, respectively.

The primary cache access pipeline 23 and secondary cache access pipeline 28 are pipelines for receiving access requests to the primary cache 3 and secondary cache 4. The primary cache access pipeline 23 has five stages, i.e., P, T, M, B, and R. The P stage selects an address and transfers the address; the T stage refers to the tag of the primary cache and a translation lookup table (TLB) by using the transferred address; the M stage compares (i.e., matching) data obtained as the reference result of the T stage; the B stage selects and transfers the data in the primary cache on the basis of the comparison result; and the R stage calculates and sends a flag indicating whether or not the transferred data corresponds to a cache miss in the primary cache 3 and whether or not the TLB mistake is valid or invalid. The secondary cache access pipeline 28 has the stage of PR1 and XPO-14 with each stage carrying out a port selection, an L2 $ tag search, an address comparison, registration in L2 $ MIB at an L2$ mistake, an L2$ data readout at an L2$ hit, and a transfer of L2$ data to the L1 $ MIB.

The primary cache move-in buffer (L1 $ MIB) 24 and secondary cache move-in buffer (L2 $ MIB) 29 are for buffering move-in instructions generated for the primary cache 3 and secondary cache 4.

The pre-fetch queue (PFQ) 25 already registers an address beyond an address at which a pre-fetch has previously been carried out, so that, if a cache miss occurs in the primary cache 3, the address at which the cache miss has occurred and the address registered in the pre-fetch queue (PFQ) 25 are matched. If the address registered in the pre-fetch queue (PFQ) 25 is registered, a pre-fetch request is issued to the secondary cache pre-fetch port (L2 $ PFP) 27. The secondary cache pre-fetch port (L2 $ PFP) 27 is for receiving a pre-fetch request from the pre-fetch queue (PFQ) 25.

The operation of the configuration shown in FIG. 2 is described in the following.

When a load instruction or the like is decoded and a request for reading (simply noted as "read request" hereinafter) the memory is issued, the request is input from the fetch port (FP) 21 to the primary cache access pipeline 23. If the primary cache is hit corresponding to the read request, the data is returned from the fetch port (FP) 21 to the processor unit 1 that has originally issued the request, and the data is written to a register 31.

If a cache miss occurs in the primary cache 3, the data must be brought from the secondary cache 4, and therefore the request is sent to the primary cache move-in buffer (L1 $ MIB) 24. The primary cache move-in buffer (L1 $ MIB) 24 issues a read request to the secondary cache 4. The request is put into the secondary cache access pipeline 28 by way of the secondary cache move-in port (L2 $ MIP) 26, which is disposed for receiving a request from the secondary cache 4.

Then, if the read request is hit in the secondary cache 4, the date is put into the primary cache move-in buffer (L1 $ MIB) 24 that then acquires the primary cache access pipeline 23 and writes the data to the primary cache 3 (in the case of a cache miss in the primary cache and a secondary cache hit).

Next is a description of carrying out a hardware pre-fetching.

If a cache miss occurs in the primary cache 3 and if the address operating as a hardware pre-fetching is not registered in the pre-fetch queue (PFQ) 25, the address is registered once in the pre-fetch queue (PFQ) 25. In this event, an address 64 B ahead is registered as put forth in the reference patent document 1. Then, when the registered address 64 B ahead is accessed, a cache miss occurs in the primary cache 3, and also the pre-fetch queue (PFQ) 25 is hit. In this event, the pre-fetch queue (PFQ) 25 sends a request for pre-fetching the +128 B address to the secondary cache pre-fetch port (L2 $ PFP) 27 by further adding 64 B.

The cache miss in the primary cache is registered both in the secondary cache move-in port (L2 $ MIP) 26 and secondary cache pre-fetch port (L2 $ PFP) 27, and then the data is returned if the secondary cache is accessed and hit. In contrast, if a cache miss occurs, it is registered in the secondary cache move-in buffer (L2 $ MIB) 29 and is output to the system controller move-in port (SCMIP) 30, and a request is sent to the main storage apparatus 5. Then, when data is returned from the main storage apparatus 5, the data is written to the secondary cache 4 by way of the secondary cache access pipeline 28 and, at the same time, is returned to the primary cache access pipeline 23 by way of a bypass, and the data is written to the primary cache 3.

Figure 3:
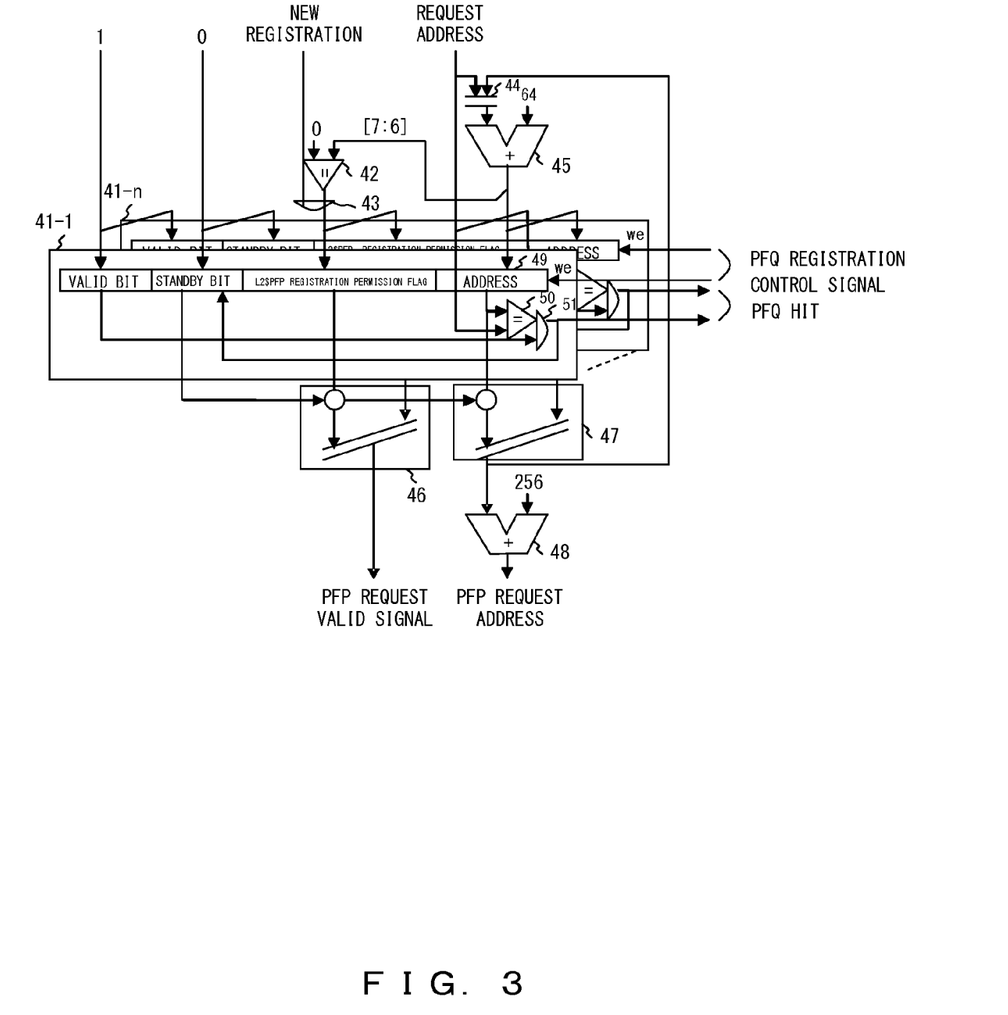
FIG. 3 is a diagram exemplifying the configuration of a pre-fetch queue (PFQ) according to a first preferred embodiment.

FIG. 3 is a diagram exemplifying the configuration of a pre-fetch queue (PFQ) according to a first preferred embodiment.

Referring to FIG. 3, comprising a pre-fetch control apparatus 2 comprise a selection circuit 44, an adder 45, selection circuits 46 and 47, and an adder 48, and individual entries 41-1 through 41-n each comprise a register 49, in which an address value registered in the entry 41, and the like, are set, a comparator 50 for comparing a request address with the address registered in the register 49, and an AND circuit for calculating the intersection of the comparison result of the comparator and the valid bit registered in the register 49.

The register 49 has, in addition to an address value, a record of a valid bit, standby bit, and an L2 $ PFP registration permission flag that functions as a state flag.

A valid bit registered in the register 49, used for indicating whether or not an address value registered in the register 49 is valid, is set when the address value is registered and is reset when the address value is read from the entry 41. In the entry 41 in which the valid bit is set, the standby bit is set when the request address sent from the primary cache access pipeline 23 matches the address value registered in the register 49. The pre-fetch address queue (PFQ) 25 determines from the state of the standby bit the entries 41-1 through 41-n carrying out a readout. The L2 $ PFP registration permission flag is used for judging whether or not the next 256 B continuous address is to be registered in the secondary cache pre-fetch port (L2 $ PFP) 27 when the request address sent from the primary cache access pipeline 23 matches the address registered in the entry 41. If '1' is set in the L2 $ PFP registration permission flag, performs a registration in the secondary cache pre-fetch port (L2 $ PFP) 27, and, if '0' is set in the aforementioned flag, does not perform a registration in the secondary cache pre-fetch port (L2 $ PFP) 27.

If a request address is input from the primary cache access pipeline 23 and if the address is registered anew, '1' is input to the valid bit, '0' is input to the standby bit, '1' is input to the L2 $ PFP registration permission flag, and a value which is the result of the adder 45 adding '64' to the request address is input to the address.

If the address registered in the register 49 is updated, the result of an OR circuit 43 calculating the union of the comparison result of the comparator 42 that indicates whether or not the output bit [7:6] of the adder 45 is '0' and the result that indicates whether or not it is a new registration. The content of the L2 $ PFP registration permission flag is the selection signal of the selection circuits 46 and 47, with '1' being output as a PFP request signal when the L2 $ PFP registration permission flag is '1', and the resulting value of the adder 48 adding 256 B to the register value registered in the register 49 of the entry 41 is output as a PFP request address. Then, the output of these causes the PFP request address to be registered in the secondary cache pre-fetch port (L2 $ PFP) 27.

Figure 4:
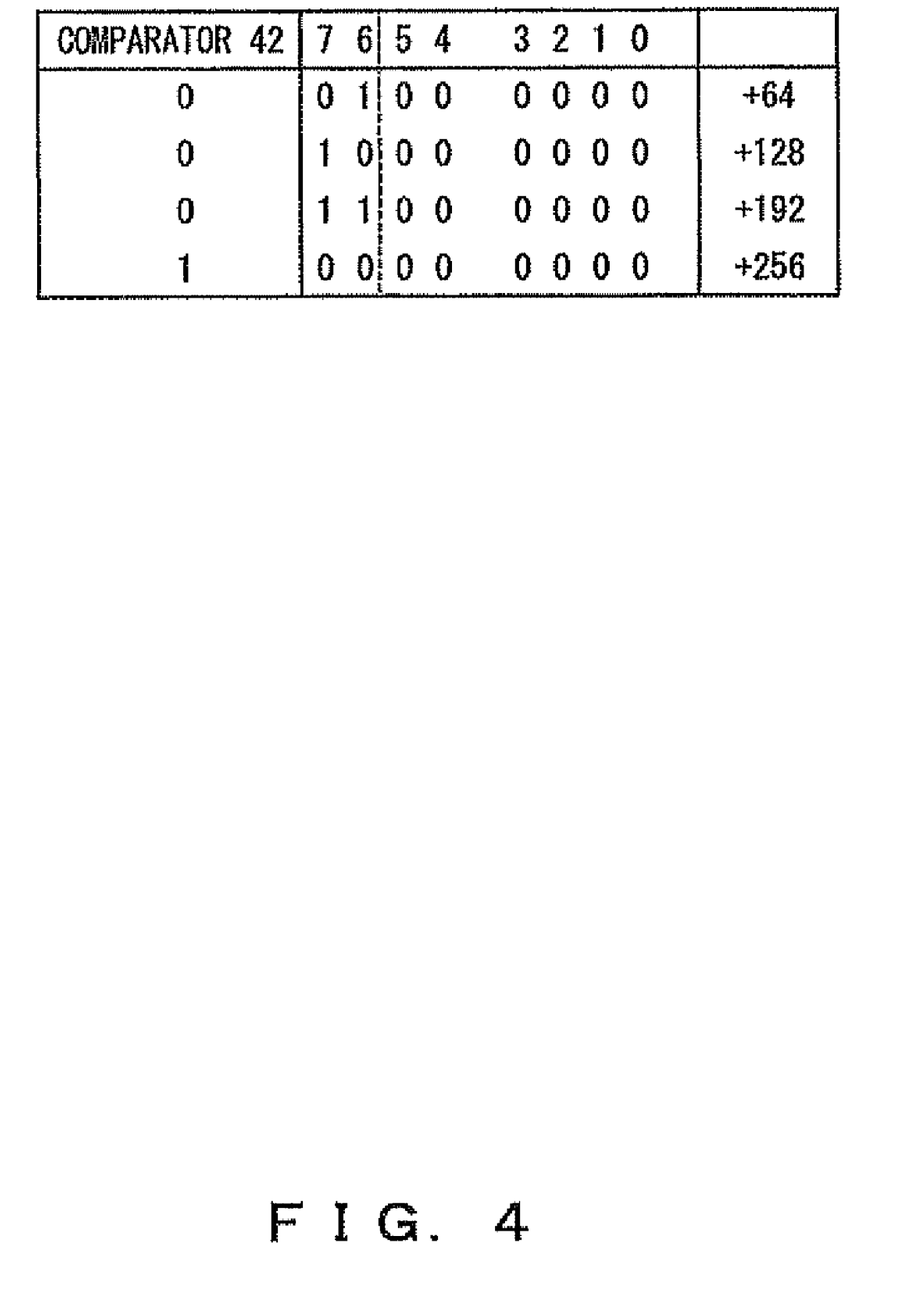
FIG. 4 is a diagram showing the relationship between the output address of an adder and the output of a comparator.

FIG. 4 is a diagram showing the relationship between the output address of the adder 45 and the output of the comparator 42.

When the adder 45 increments the address value set in the register 49 by 64 B and registers the result in the register 49, the output address bit [7:6] turns out to be '0' one in four times, and therefore, '1' is output from the comparator 42 one in four times, and the output is set to the L2 $ PFP registration permission flag by way of the OR circuit 43. Incidentally, if the registration to the register 49 is a new registration, '1' is set to the L2 $ PFP registration permission flag. Therefore, '1' is set to the L2 $ PFP registration permission flag one in every four updates of an address starting from the new registration of the address, and a PFP request address is registered in the secondary cache pre-fetch port (L2 $ PFP) 27.

The L2 $ PFP registration permission flag is set when performing a new registration in the pre-fetch queue (PFQ) 25 and when performing an update registration of the heading 64 B address of a 256 boundary in the pre-fetch queue (PFQ) 25. Further, the aforementioned flag is reset when performing an update registration of an address other than the heading 64 B of a 256 boundary in the PFQ.

When the request address of a pre-fetch is input from the primary cache access pipeline 23 and the address value is compared by the comparator 50 with the address value within the register 49, the pre-fetch queue (PFQ) 25 makes an AND circuit take the AND between the comparison result and the valid bit and outputs, to the primary cache access pipeline 23, the AND result as a PFQ signal indicating whether or not the PFQ is hit. Therefore, if the request address matches the register 49 and if the valid bit is '1', the resulting PFQ hit signal results is '1'.

Further, even if the line sizes of the upper layer and lower layer cache memory are different, that is, the line size, i.e., 64 B, of the primary cache 3 comparable to the line size, i.e., 256 B of the secondary cache 4, the registration of the address value to the secondary cache pre-fetch port (L2 $ PFP) 27 can be carried out one in four times (i.e., 256 B/64 B) so that a pre-fetch request results in once for the line size of the secondary cache 4. This, in turn, makes it possible to suppress the consumption of an extraneous lower layer cache access pipeline and to improve performance.

Next is a description of the detailed procedure of the process in response to a memory access instruction of a processor including a pre-fetch operation by referring to FIGS. 2 and 3.

The following description is provided by exemplifying the case of the processor unit decoding a load instruction to the addresses A, A+8, A+16, and so on, through A+56.

1: The load instruction acquires the primary cache access pipeline 23 by way of the fetch port (FP) 21.

2: The primary cache is accessed with the address A in the primary cache access pipeline 23.

3: As a result of paragraph 2, a cache miss in the primary cache is detected in the primary cache access pipeline 23.

4: A miss address is registered in the primary cache move-in buffer (L1 $ MIB) 24.

4.1: The primary cache move-in buffer (L1 $ MIB) 24 issues a move-in request to the secondary cache move-in port (L2 $ MIP) 26 for moving from the secondary cache 4 to the primary cache 3.

4.2: The secondary cache move-in port (L2 $ MIP) 26 acquires the secondary cache access pipeline 28 and accesses the secondary cache with the address A.

4.3: As a result of procedure 4.2, a cache miss in the secondary cache is detected in the secondary cache access pipeline 28.

4.4: A miss address is registered in the secondary cache move-in buffer (L2 $ MIB) 29.

4.5: The secondary cache move-in buffer (L2 $ MIB) 29 issues a move-in request to the system controller move-in port (SCMIP) 30 for moving from the main storage apparatus 5 to the secondary cache 4.

4.6: The system controller move-in port (SCMIP) 30 extracts data in the amount of 256 B of the miss address A from the main storage apparatus 5 and moves the data into the secondary cache move-in buffer (L2 $ MIB) 29.

4.7: The secondary cache move-in buffer (L2 $ MIB) 29 acquires the secondary cache access pipeline 28 and writes the 256 B move-in data to the secondary cache 4.

4.8: The secondary cache move-in buffer (L2 $ MIB) 29 transfers, by way of a by pass, the 64 B move-in data to the primary cache move-in buffer (L1 $ MIB) 24.

4.9: The load instruction mis-cached in the primary cache at the address A acquires the primary cache access pipeline 23, reads the move-in data transferred to the primary cache move-in buffer (L1 $ MIB) 24 by way of the bypass and writes the data to a register 31 within the processor unit 1.

4.10: The primary cache move-in buffer (L1 $ MIB) 24 acquires the primary cache access pipeline 23 and writes the 64 B move-in data to the primary cache 3.

5: The pre-fetch queue (PFQ) 25 detects a cache miss.

6: The next continuous address (A+64) is registered anew in the pre-fetch queue (PFQ) 25. The L2 $ PFP registration permission flag within the register 49 is set.

7: A load instruction to access the continuous addresses (A+8, A+16, and so on, through A+56) acquires the primary cache access pipeline 23.

8: If the move-in data from the secondary cache 4 has not arrived in this event, a primary cache MIB hit and a data miss are detected, and the primary cache access pipeline 23 is aborted. The aborted request is returned to the fetch port (FP) 21.

9: In contrast, if the move-in data from the secondary cache 4 has arrived but yet the data is not written to the primary cache 3, a primary cache MIB hit and a data hit are detected, the data of the primary cache move-in buffer (L1 $ MIB) 24 is read by way of a bypass, and the data is written to the register 31.

10: Meanwhile, if the move-in data from the secondary cache 4 has arrived and if the data is written to the primary cache 3, then a primary cache hit is detected, the data is read from the primary cache 3, and the data is written to the register 31.

Figure 5:
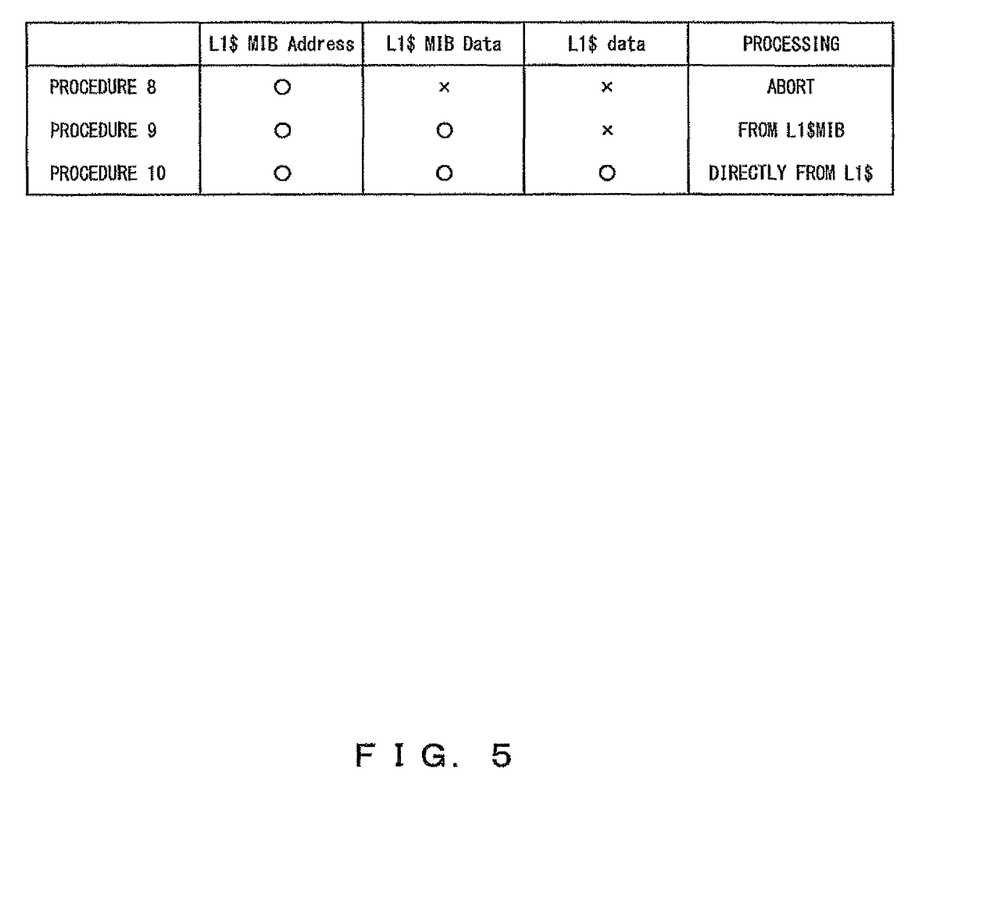
FIG. 5 is a diagram showing each state in procedures 8, 9, and 10.

FIG. 5 is a diagram showing each state in procedures 8, 9, and 10.

In the state of procedure 8, although the address has arrived from the primary cache move-in buffer (L1 $ MIB) 24, data has not arrived and the data is not written to the primary cache 3, and therefore, the primary cache access pipeline 23 is aborted.

In the state of procedure 9, although the address and data have arrived from the primary cache move-in buffer (L1 $ MIB) 24, the data is not written to the primary cache 3, and therefore the data is read from the primary cache move-in buffer (L1 $ MIB) 24 and is written to the register 31.

Further, in the state of procedure 10, the address and data have arrived from the primary cache move-in buffer (L1 $ MIB) 24, and the data has been written to the primary cache 3, and therefore the data is read from the primary cache 3 and written to the register 31.

Next the description of the process related to a load instruction for accessing the continuous address (A+64) is continued.

11: As in procedure 1, the load instruction for accessing the continuous address (A+64) acquires the primary cache access pipeline 23.

12: As a result of procedure 11, a cache miss in the primary cache is detected.

12.1: A miss address is registered in the primary cache move-in buffer (L1 $ MIB) 24, and the secondary cache 4 is accessed.

12.2: a secondary cache hit is detected, 64 B data is read from the secondary cache, and the data is transferred to the primary cache move-in buffer (L1 $ MIB) 24.

12.3: The load instruction mis-cached in the primary cache at the address (A+64) reads the data in the primary cache move-in buffer (L1 $ MIB) 24 by way of bypass and writes the data to the register 31.

12.4: The primary cache move-in buffer (L1 $ MIB) 24 writes the 64 B data to the primary cache 3.

13: A hit of the pre-fetch queue (PFQ) 25 is detected, and the standby bit of the register 49 is set.

14: The next continuous address (A+128) is registered in the pre-fetch queue (PFQ) 25. The L2 $ PFP registration permission flag within the register 49 is reset.

15: The L2 $ PFP registration permission flag had been set until it was reset in procedure 14, and therefore, the next 256 B continuous address (A+64+256) is registered in the secondary cache pre-fetch port (L2 $ PFP) 27.

15.1: The secondary cache pre-fetch port (L2 $ PFP) 27 acquires the secondary cache access pipeline 28 and accesses the address (A+64+256) in the secondary cache 4.

15.2: As a result of procedure 15.1, a cache miss in the secondary cache is detected.

15.3: A cache miss address is registered in the secondary cache move-in buffer (L2 $ MIB) 29.

15.4: The secondary cache move-in buffer (L2 $ MIB) 29 issues a move-in request to the system controller move-in port (SCMIP) 30 for moving from the main storage apparatus 5 to the secondary cache 4.

15.5: The system controller move-in port (SCMIP) 30 extracts data from the miss address (A+64+256) of the main storage apparatus 5 equivalent to 256 B and moves the 256 B data into the secondary cache move-in buffer (L2 $ MIB) 29.

15.6: The secondary cache move-in buffer (L2 $ MIB) 29 acquires the secondary cache access pipeline 28 and writes the 256 B move-in data to the secondary cache 4.

16: Likewise, the load instruction for accessing the continuous address (A+64+8, A+64+16, and so on, through A+64+56) acquires the primary cache access pipeline 23.

17: If move-in data has not yet arrived from the secondary cache 4, a primary cache MIB hit and a data miss are detected, and the primary cache access pipeline 23 is aborted. The aborted request is returned to the fetch port (FP) 21.

18: If the move-in data has arrived from the secondary cache 4 and if the data is not written to the primary cache 3, a primary cache MIB hit and a data hit are detected, the data of the primary cache move-in buffer (L1 $ MIB) 24 is read by way of a bypass, and the data is written to the register 31.

19: If the move-in data has arrived from the secondary cache 4 but yet the data is not written to the primary cache 3, a primary cache hit is detected, the data is read from the primary cache 3, and the data is written to a register 41.

Next is the continued description of the process related to the load instruction for accessing a continuous address (A+128).

20: Likewise procedures 1 and 11, the load instruction for accessing a continuous address (A+128) acquires the primary cache access pipeline 23.

21: As a result of procedure 20, a cache miss in the primary cache is detected.

21.1: A mis-cached address is registered in the primary cache move-in buffer (L1 $ MIB) 24, and the secondary cache is accessed.

21.2: As a result of procedure 21.1, a secondary cache hit is detected, 64 B data is read from the secondary cache 4, and the data is transferred to the primary cache move-in buffer (L1 $ MIB) 24.

21.3: The load instruction mis-cached in the primary cache at the address (A+128) reads the data from the primary cache move-in buffer (L1 $ MIB) 24 by way of a bypass and writes the data to the register 31.

21.4: The primary cache move-in buffer (L1 $ MIB) 24 writes the 64 B data to the primary cache 3.

22: A hit of the pre-fetch queue (PFQ) 25 is detected. The standby bit of the register 49 is set.

23: The next continuous address (A+192) is registered in the pre-fetch queue (PFQ) 25. The L2 $ PFP registration permission flag is reset.

24: (The L2 $ PFP registration permission flag had been set until it was reset in procedure 23 and therefore the next 256 continuous address (A+128+256) is not registered in the secondary cache pre-fetch port (L2 $ PFP) 27.)

25: Likewise, a load instruction for accessing a continuous address (A+128+8, A+128+16, and so on, through A+128+56) acquires the primary cache access pipeline 23.

26: If move-in data has not arrived from the secondary cache 4, a primary cache move-in buffer (L1 $ MIB) 24 and a data miss are detected, and the primary cache access pipeline 23 is aborted. The aborted request is returned to the fetch port (FP) 21.

27: If the move-in data has arrived from the secondary cache 4 but yet the data is not written to the primary cache 3, a primary cache MIB hit and a data hit are detected, and the data of the primary cache MIB is read by way of a bypass and written to the register 31.

28: If the move-in data has arrived from the secondary cache 4 and if the data is written to the primary cache 3, a primary cache hit is detected, and the data is read from the primary cache 3 and written to the register 31.

Next is the continued description of the process related to a load instruction for accessing the continuous address (A+192).

29: Like procedures 1, 11, and 20, the load instruction for accessing the continuous address (A+192) acquires the primary cache access pipeline 23.

30: As a result of procedure 29, a cache miss in the primary cache is detected.

30.1: A mis-cached address is registered in the primary cache move-in buffer (L1 $ MIB) 24, and the secondary cache 4 is accessed.

30.2: a secondary cache hit is detected, 64 B data is read from the secondary cache 4, and the data is transferred to the primary cache move-in buffer (L1 $ MIB) 24.

30.3: The load instruction mis-cached in the primary cache reads data from the primary cache move-in buffer (L1 $ MIB) 24 and writes the data to the register 31.

30.4: The primary cache move-in buffer (L1 $ MIB) 24 writes the 64 B data to the primary cache 3.

31: A hit of the pre-fetch queue (PFQ) 25 is detected. The standby bit of the register 49 is set.

32: The next continuous address (A+256) is registered in the pre-fetch queue (PFQ) 25. The L2 $ PFP registration permission flag of the register 49 is set.

33: (The L2 $ PFP registration permission flag had been reset until it was set in procedure 32, and therefore the next 256 B continuous address (A+192+256) is not registered in the secondary cache pre-fetch port (L2 $ PFP) 27.)

34: Likewise, a load instruction for accessing a continuous address (A+192+8, A+192+16, and so on, through A+192+56) acquires the primary cache access pipeline 23.

35: If move-in data has not arrived from the secondary cache 4, a primary cache move-in buffer (L1 $ MIB) 24 hit and a data miss are detected, and the primary cache access pipeline 23 is aborted. The aborted request is returned to the fetch port (FP) 21.

36: If the move-in data has arrived but yet the data is not written to the primary cache 3, a primary cache move-in buffer (L1 $ MIB) 24 hit and a data hit are detected, the data is read from the primary cache move-in buffer (L1 $ MIB) 24 by way of a bypass, and the data is written to the register 31.

37: If the move-in data has arrived and if the data is written to the primary cache 3, a primary cache hit is detected, and the data is read from the primary cache 3 and written to the register 31.

Next is the continued description of the process related to a load instruction for accessing a continuous address (A+256).

38: Likewise, the load instruction for accessing the continuous address (A+256) acquires the primary cache access pipeline 23.

39: As a result of procedure 38, a cache miss in the primary cache 3 is detected.

39.1: A miss address is registered in the primary cache move-in buffer (L1 $ MIB) 24, and the secondary cache 4 is accessed.

39.2: a secondary cache hit is detected, and 64 B data is read from the secondary cache 4 and transferred to the primary cache move-in buffer (L1 $ MIB) 24.

39.3: The load instruction mis-cached in the primary cache reads data from the primary cache move-in buffer (L1 $ MIB) 24 by way of a bypass and writes the data to the register 31.

39.4: the primary cache MIB writes the 64 B data to the primary cache 3.

40: A pre-fetch queue (PFQ) 25 hit is detected. The standby bit within the register 49 is set.

41: The next continuous address (A+320) is registered in the pre-fetch queue (PFQ) 25. The L2 $ PFP registration permission flag within the register 49 is reset.

42: The L2 $ PFP registration permission flag had been set until it was reset in procedure 41, and therefore, the next continuous address (A+256+256) is registered in the secondary cache pre-fetch port (L2 $ PFP) 27.

42.1: The secondary cache pre-fetch port (L2 $ PFP) 27 acquires the secondary cache access pipeline 28 and accesses the secondary cache 4 with the address (A+256+256).

42.2: As a result of procedure 42.1, a cache miss in the secondary cache is detected.

42.3: A miss address is registered in the primary cache move-in buffer (L1 $ MIB) 24.

42.4: The primary cache move-in buffer (L1 $ MIB) 24 issues a move-in request to the system controller move-in port (SCMIP) 30 for moving from the main storage apparatus 5 to the secondary cache 4.

42.5: The system controller move-in port (SCMIP) 30 extracts data equivalent to 256 B from the cache miss address (A+256+256) of the main storage apparatus 5 and moves the data into the secondary cache move-in buffer (L2 $ MIB) 29.

42.6: The secondary cache move-in buffer (L2 $ MIB) 29 acquires the secondary cache access pipeline 28 and writes the 256 B move-in data to the secondary cache 4.

What follows is a repetition of the similar processes related to the load instruction for accessing the continuous addresses (A+320), (A+384), and so on.

Figure 6:
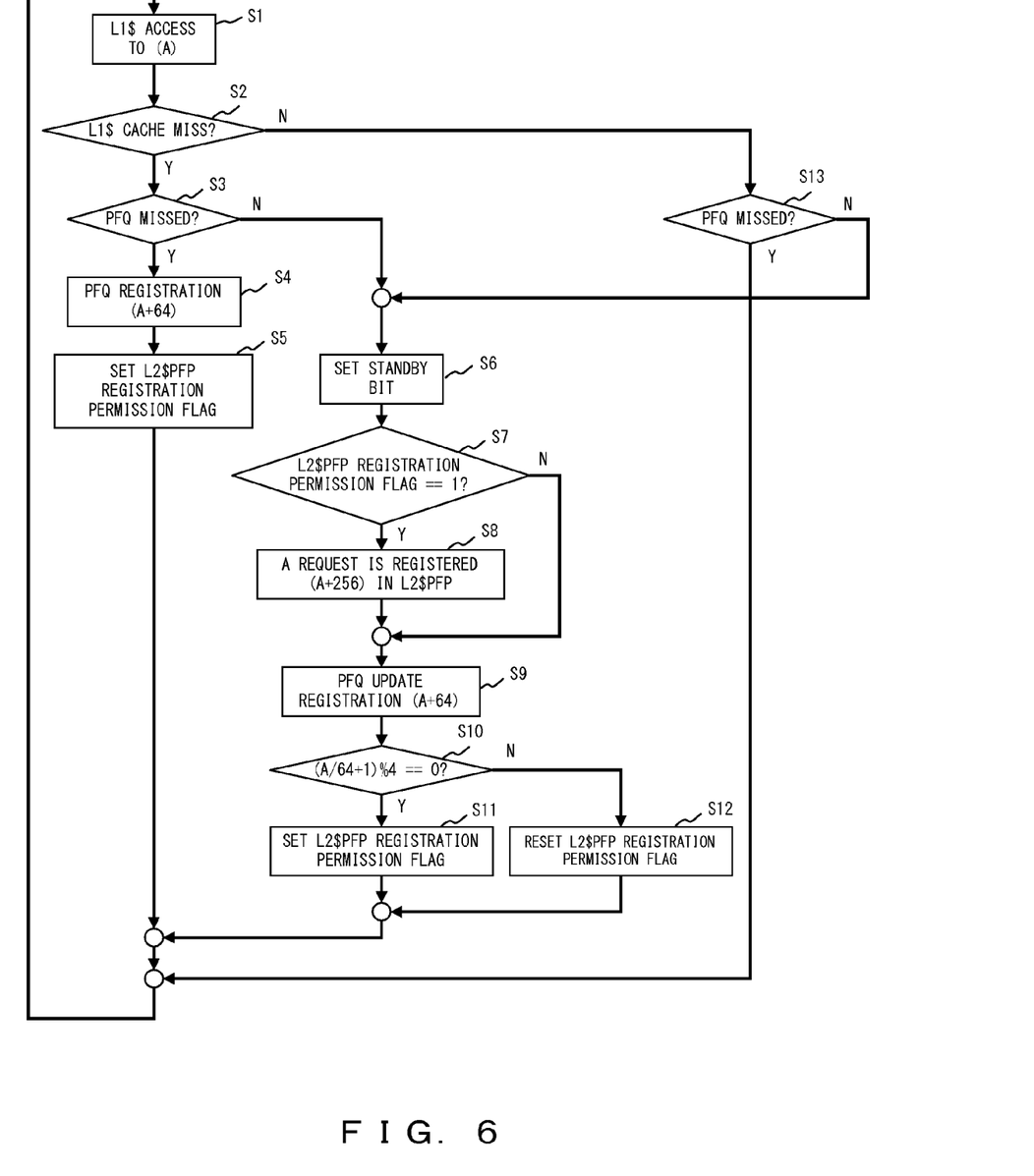
FIG. 6 is a flow chart showing the operation of the pre-fetch queue (PFQ) according to a first preferred embodiment.

FIG. 6 is a flow chart showing the operation of the pre-fetch queue (PFQ) 25 according to the first embodiment shown in FIG. 3.

In step S1, the primary cache 3 is accessed at an address A. If the primary cache 3 is mis-cached (yes (Y) for step S2) and if the pre-fetch queue (PFQ) 25 is also missed (Y for step S3), a future address (A+64) ahead by one line of the primary cache 3 is registered in the pre-fetch queue (PFQ) 25, the L2 $ PFP registration permission flag of the register 49 within the pre-fetch queue (PFQ) 25 is set (step S4), and returns the process to step S1.

In contrast, if the primary cache 3 is hit in step S2 (no (N) for step S2) and if the pre-fetch queue is missed (Y for step S3), the process is returned to step S1.

Further, if a cache miss occurs in the primary cache 3 (Y for step S2) with the pre-fetch queue (PFQ) 25 being hit (N for step S3) and if the primary cache 3 is hit (N for step S2) with the pre-fetch queue (PFQ) 25 also being hit (N for step S3), the process is shifted to step S6, and a pre-fetch is carried out.

In step S6, the standby bit within the register 49 of the pre-fetch queue (PFQ) 25 is set. Then, if the L2 $ PFP registration permission flag within the register 49 has been set (Y for step S7), a pre-fetch request is registered in the secondary cache pre-fetch port (L2 $ PFP) 27 at a PFP request address (A+64). If the L2 $ PFP registration permission flag is not set (N for step S7), a request is not registered in the secondary cache pre-fetch port (L2 $ PFP) 27.

Then in step S9, following an update of the registered address of the pre-fetch queue (PFQ) 25 to 'A+64' and then, if the residue of the division (A/64+1)/4 is '0', the L2 $ PFP registration permission flag within the register 49 is set (step S11), and the process is returned to S1. In contrast, if the residue of the division (A/64+1)/4 is not '0', the L2 $ PFP registration permission flag is reset (step S12), and the process is returned to step S1.

As described above, the present first embodiment makes it possible to issue a pre-fetch request for each line size of the lower layer cache register, thereby preventing an extraneous pre-fetch request from occupying an access pipeline and therefore improving performance.

Next is a description of a second configuration example of the pre-fetch queue (PFQ) 25.

As compared to the pre-fetch queue (PFQ) 25 according to the first embodiment, which is configured to register one pre-fetch request to the secondary cache pre-fetch port (L2 $ PFP) 27 for n-times of continuous access, where the size of one line of the lower layer cache is 'n' times of the size of one line of the upper layer cache, the pre-fetch queue (PFQ) 25, according to the second embodiment, is configured to register two or more pre-fetch requests for every 'n' times.

If the data size moved in due to a cache miss in the lower layer cache equals the line size thereof, a request or a hardware pre-fetching issued to the lower layer cache may be one time for the line size of the lower layer cache likewise the case of the pre-fetch queue (PFQ) 25 according to the first embodiment.

A pre-fetch request is sometimes lost due to the limitation of hardware implementation, and therefore, only one issue of pre-fetch request will fail to issue a request for moving memory data into the lower layer cache if the hardware pre-fetching is lost. The "limitation of hardware implementation" means that, while a pre-fetch request is registered in the secondary cache move-in buffer (L2 $ MIB) 29 if a cache miss occurs in, for example, the secondary cache 4; if the secondary cache move-in buffer (L2 $ MIB) 29 is full, re-registration is not carried out, and therefore, the pre-fetch request is sometimes lost.

As a countermeasure to the above situation, the pre-fetch queue (PFQ) 25, according to the second embodiment, is configured to issue multiple pre-fetch requests to the secondary cache pre-fetch port (L2 $ PFP) 27 for the line size of the lower layer cache.

Figure 7:
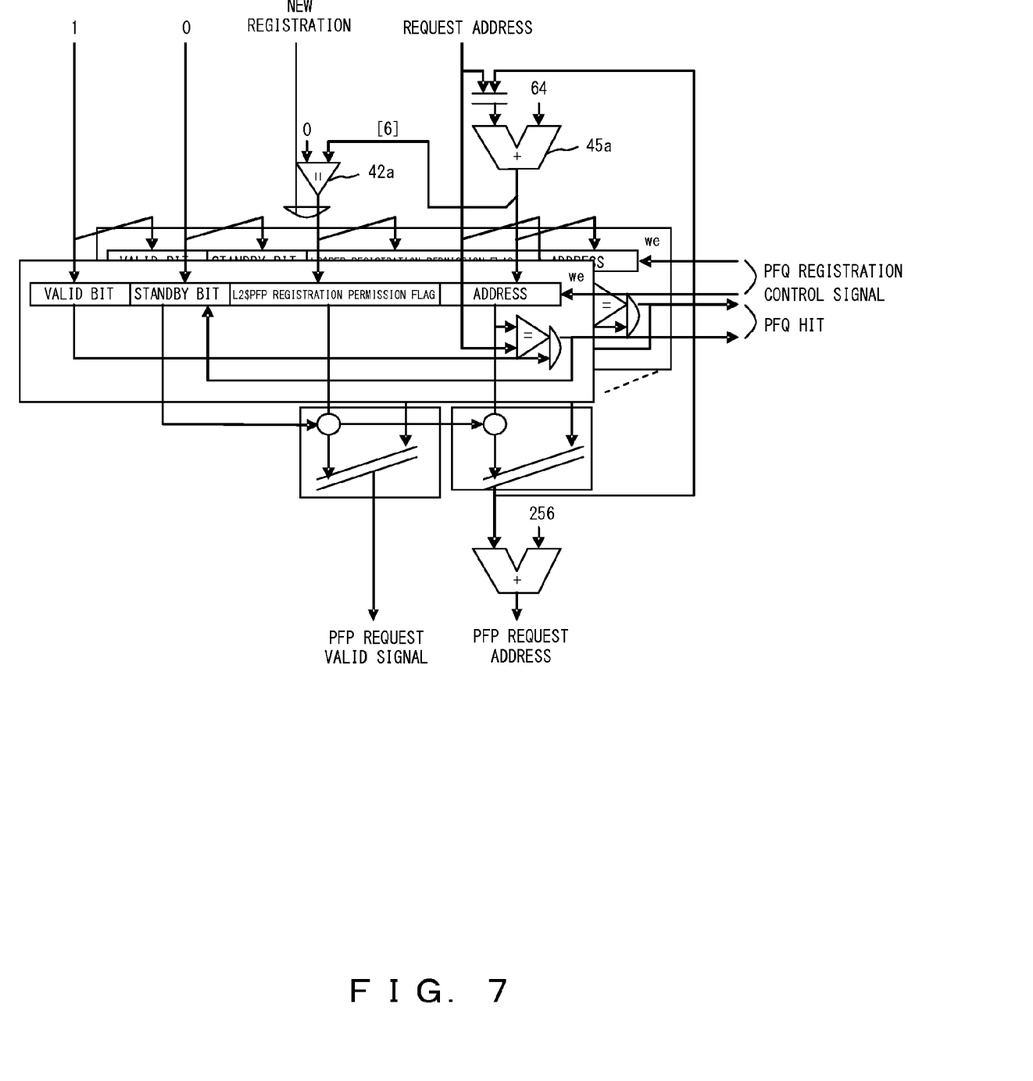
FIG. 7 is a diagram exemplifying the configuration of a pre-fetch queue (PFQ) according to a second preferred embodiment.

FIG. 7 is a diagram exemplifying the configuration of the pre-fetch queue (PFQ) 25 according to the second embodiment. Note that FIG. 7 delineates a form in comparison with the pre-fetch queue (PFQ) 25 of the first embodiment shown in FIG. 3.

Comparing the configuration of FIG. 7 with the pre-fetch queue (PFQ) 25 of the first embodiment shown in FIG. 3, the comparator 42*a* input is only a bit [6] of the address output calculated from an adder 45*a* in the former configuration. Therefore, as compared to the first embodiment configured to set the L2 $ PFP registration permission flag to '1' one in four times when updating the address of the register 49, the pre-fetch queue (PFQ) 25, according to the second embodiment is configured to set the L2 $ PFP registration permission flag two in four times when updating the address so as to register the request in the secondary cache pre-fetch port (L2 $ PFP) 27.

With this configuration, the second embodiment makes it possible to deal with the possible case of losing one pre-fetch request due to a problem implementing the hardware.

Next is a description of a pre-fetch queue (PFQ) 25 according to a third preferred embodiment.

The pre-fetch queue (PFQ) 25, according to the third embodiment, is also configured to deal with the case of losing a pre-fetch request due to problems implementing the hardware as was in the case of the second embodiment.

The third embodiment is configured to issue a pre-fetch request to the secondary cache pre-fetch port (L2 $ PFP) 27 so as to pre-fetch a block of two times the line size of the upper layer cache or more. With this configuration, a pre-fetch request is unfolded two times or more in the secondary cache pre-fetch port (L2 $ PFP) 27, resulting in the issuance of multiple pre-fetch requests.

Figure 8:
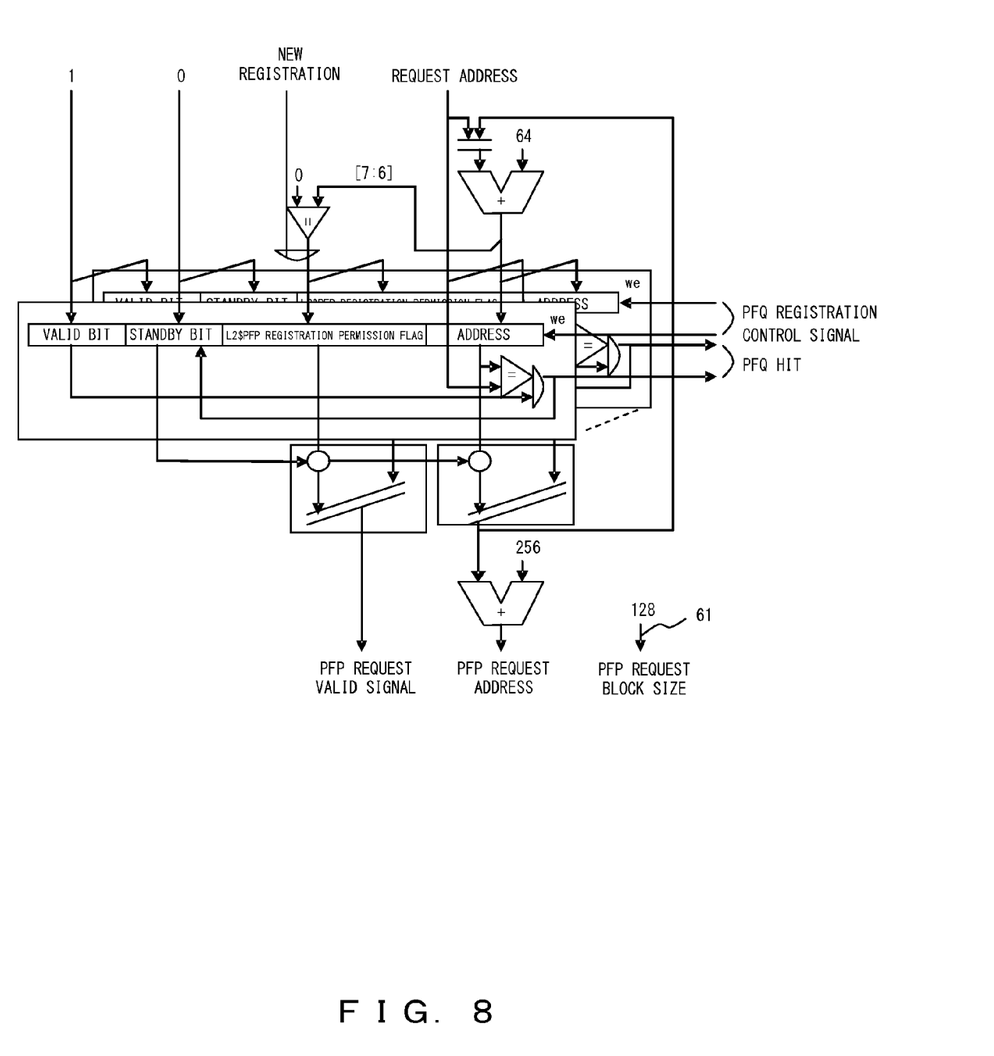
FIG. 8 is a diagram exemplifying the configuration of a pre-fetch queue (PFQ) according to a third preferred embodiment.

FIG. 8 is a diagram exemplifying the configuration of a pre-fetch queue (PFQ) 25 according to a third preferred embodiment. Note that FIG. 8 also delineates a form in comparison with the pre-fetch queue (PFQ) 25 of the first embodiment shown in FIG. 3.

Comparing the configuration of the pre-fetch queue (PFQ) 25 of the third embodiment shown in FIG. 8 with the pre-fetch queue (PFQ) 25 of the first embodiment shown in FIG. 3, a PFP request block size 61 output to the secondary cache pre-fetch port (L2 $ PFP) 27 is 128 B, that is, twice the line size of the primary cache 3 in the former configuration. Incidentally, although not shown in a drawing herein, the PFP request block size is 64 B, that is, the same as the line size of the primary cache 3 in the first embodiment shown in FIG. 3.

With this configuration, the pre-fetch queue (PFQ) 25, according to the third embodiment, is configured to issue a pre-fetch request to the secondary cache pre-fetch port (L2 $ PFP) 27 by designating a block size of twice the line size of the primary cache 3, thereby issuing the pre-fetch request two times at the secondary cache pre-fetch port (L2 $ PFP) 27.

This configuration, in turn, enables the third embodiment to deal with a possible case of losing one pre-fetch request due to a problem implementing the hardware.

Next is a description of a pre-fetch queue (PFQ) 25 according to a fourth preferred embodiment.

The pre-fetch queue (PFQ) 25, according to the fourth embodiment, is configured to enable a changeover between a move-in for each line size (256 B) of the lower layer cache carried out in the present embodiment and a move-in for each line size (64 B) of the upper layer cache carried out in the conventional processor.

This configuration makes it possible to deal with a move-in for each line size (64 B) of the upper layer cache, which is carried out in the case of a copy back.

Figure 9:
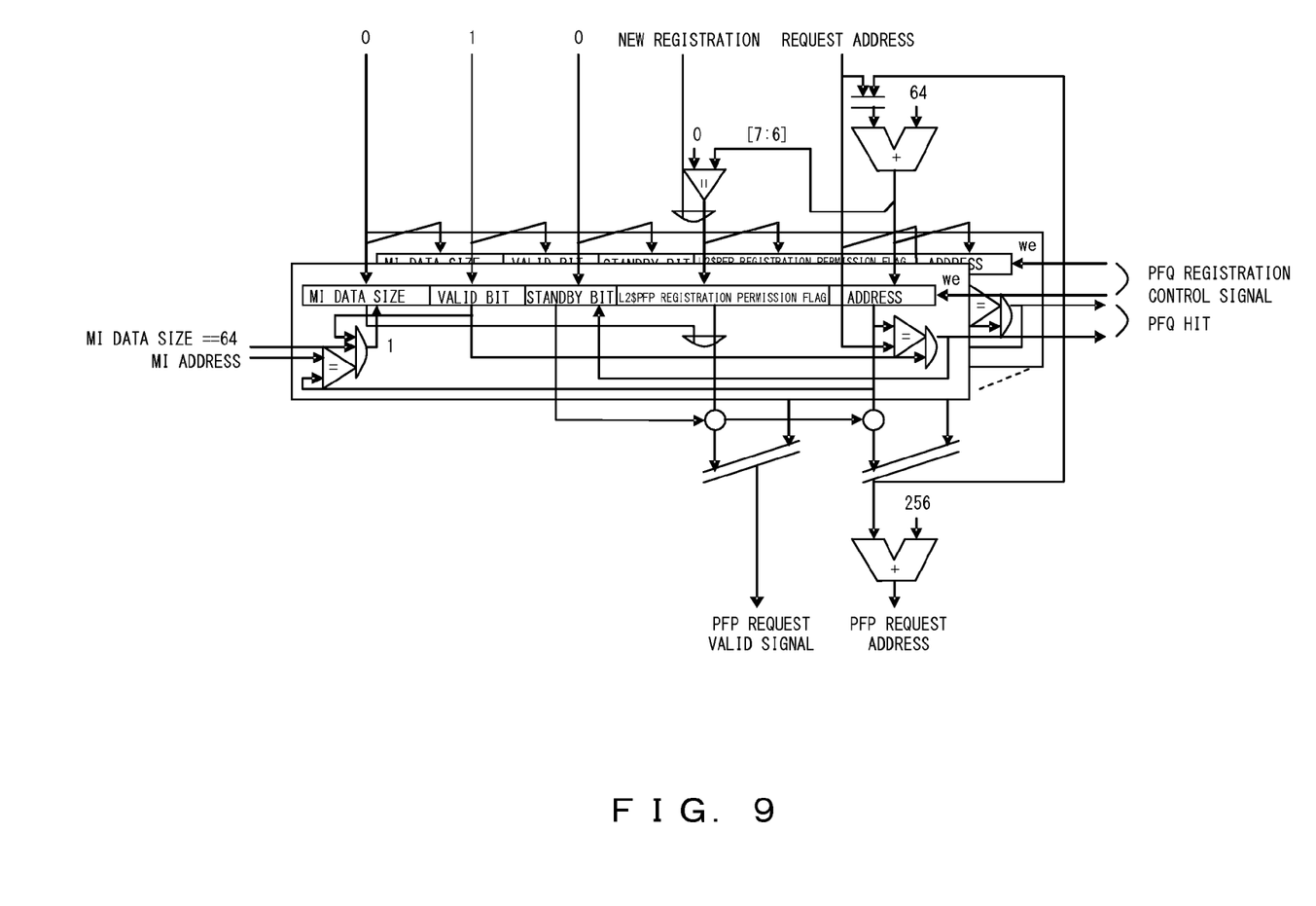
FIG. 9 is a diagram exemplifying the configuration of a pre-fetch queue (PFQ) according to a fourth preferred embodiment.

FIG. 9 is a diagram exemplifying the configuration of the pre-fetch queue (PFQ) 25 according to the fourth embodiment. Note that FIG. 9 also delineates a form in comparison with the pre-fetch queue (PFQ) 25 of the first embodiment shown in FIG. 3.

Comparing the pre-fetch queue (PFQ) 25 of the fourth embodiment shown in FIG. 9 with that of the first embodiment shown in FIG. 3, the move-in (MI) data size is stored in a register 49*b* in the configuration of FIG. 9. The MI data size determines that the pre-fetch queue (PFQ) 25 performs a move-in for every 256 B when '0' is set in the MI data size, and the data size determines that it performs a move-in for every 64 B when '1' is set in the MI data size.

An initial value '0' is set in the MI data size, and '1' is set therein by the output of an AND circuit 72 if a move-in address of a cache miss and the address set in the register 49*b* are identical, as a result of the comparator 71 comparing between the aforementioned addresses, and if the move-in data size is 64 B. Further, the result of an OR circuit 73 from the intersection of the MI data size and L2 $ PFP registration permission flag is input to a selection circuit 46*b*. Therefore, the configuration makes it possible to change over the size of a move-in such that a 256 B move-in is carried out when '0' is set in the MI data size, while a 64 B move-in is carried out when '1' is set therein.

As described above, the present embodiment makes it possible to issue a pre-fetch request for each of the line sizes of the lower layer cache register even if the line sizes are different between the upper layer cache register and lower layer cache register, thereby enabling the prevention of an extraneous pre-fetch request from consuming the cache access pipeline and improving performance.

Further, the present embodiment makes it possible to deal with the possible case of losing a pre-fetch request due to limitations of implementation.

Furthermore, the present embodiment makes it possible to deal with a move-in of the line size of the upper layer cache executed in the case of a copy back.

Note that the above described embodiments exemplify the case of applying the present invention to the pre-fetch between the secondary cache memory and main storage apparatus. The present invention, however, can be applied to a pre-fetch between, for example, the secondary cache and tertiary cache, and also between the tertiary cache and main storage apparatus if a system comprises cache memory of the tertiary cache or more, in lieu of the present invention being limited to the above described embodiments.

Meanwhile, the above described embodiments exemplify the case of applying the present invention to a configuration in which the direction of a continuous access of pre-fetch is an ascending order; the present invention, however, is applicable to a configuration in which the direction of a continuous access of pre-fetch is a descending order in lieu of the present invention being limited to the former configuration.

What is claimed is:

1. A processor equipped with a pre-fetch function, the processor comprising:
    a first layer cache memory having a first line size;
    a second layer cache memory, which is on a lower layer of the first layer cache memory and which has a plurality of lines of a second line size different from the first line size; and
    a pre-fetch control unit configured to issue a pre-fetch request from the first layer cache memory to the second layer cache memory so as to pre-fetch a block of the first line size for the second line size of the second layer cache memory.

2. The processor equipped with a pre-fetch function according to claim 1, wherein said pre-fetch control unit issues one said pre-fetch request for said second line size.

3. The processor equipped with a pre-fetch function according to claim 1, wherein said pre-fetch control unit issues a plurality of said pre-fetch requests for said second line size.

4. The processor equipped with a pre-fetch function according to claim 1, wherein said pre-fetch control unit issues said pre-fetch request so as to pre-fetch a block of twice the said first line size or more.

5. The processor equipped with a pre-fetch function according to claim 1, wherein said pre-fetch control unit designates an address distanced by said second line size beyond an address, which has been missed in said first layer cache memory, as the address of a pre-fetch destination that is to be requested for said pre-fetch.

6. The processor equipped with a pre-fetch function according to claim 1, wherein said pre-fetch control unit further comprises a changeover unit configured to change between issuing said pre-fetch request for said first line size and issuing the pre-fetch request for said second line size based on the size of moved-in data.

7. The processor equipped with a pre-fetch function according to claim 6, wherein said changeover unit changes over said pre-fetch control unit so as to issue said pre-fetch request for said first line size when a request for a copy back occurs.

8. The processor equipped with a pre-fetch function according to claim 1, wherein said pre-fetch control unit further comprises a register configured to store a registered address and an L2 $ PFP registration permission flag of which the value is determined by the present registered address, and determines whether or not to issue said pre-fetch request on the basis of the value of the L2 $ PFP registration permission flag.

9. The processor equipped with a pre-fetch function according to claim 8, wherein the value of said L2 $ PFP registration permission flag is determined by whether or not the bit of a specific position of said registered address is '0'.

10. The processor equipped with a pre-fetch function according to claim 1, wherein said first layer cache memory is the primary cache memory and said second layer cache memory is the secondary cache memory.

11. A pre-fetch control method used for a processor comprising a first layer cache memory having a first line size; and a second layer cache memory, which is on a lower layer of the first layer cache memory and which has a plurality of lines of a second line size different from the first line size, the pre-fetch control method comprising:
    detecting a cache miss in the second layer cache memory by the processor; and
    issuing a pre-fetch request from the first layer cache memory to the second layer cache memory by the processor so as to pre-fetch a block of the first line size for the second line size of the second layer cache memory.

* * * * *